United States Patent [19]

Murphy

[11] 3,825,089

[45] July 23, 1974

[54] HOUSE TRAILER HOOK-UP

[75] Inventor: David M. Murphy, Mason City, Iowa

[73] Assignee: David Manufacturing Company, Mason City, Iowa

[22] Filed: Oct. 5, 1972

[21] Appl. No.: 296,319

Related U.S. Application Data

[63] Continuation of Ser. No. 115,587, Feb. 16, 1971, abandoned.

[52] U.S. Cl. ............... 180/12, 280/43.2, 280/150.5
[51] Int. Cl. ......................................... B62d 53/04
[58] Field of Search .......... 280/12, 11, 14 R, 43.23, 280/43.2, 150.5

[56] References Cited
UNITED STATES PATENTS

| | | | |
|---|---|---|---|
| 1,155,713 | 10/1915 | Eldridge | 180/12 |
| 2,554,556 | 5/1951 | Bobard | 180/12 |
| 3,000,455 | 9/1961 | Mayfield | 180/12 |
| 3,074,500 | 1/1963 | Ulinski | 280/43.23 X |
| 3,318,611 | 5/1967 | Branning | 280/34 R |

FOREIGN PATENTS OR APPLICATIONS
245,565   11/1947   Switzerland............................ 180/12

*Primary Examiner*—Kenneth H. Betts
*Attorney, Agent, or Firm*—Merchant, Gould, Smith & Edell

[57] ABSTRACT

The disclosure is directed to the combination of a house trailer and a truck or similar vehicle for hauling the trailer. The truck has front and rear wheels, the latter of which are retractable against the bias of suspension leaf springs. The front end of the trailer includes a retractable stand on each side for supporting the trailer when at rest. To transport the trailer, its forward portion is received by the bed of the truck, which is disposed over the rear wheels. The trailer stands are constructed and arranged to engage the rear wheels upon retraction to elevate the wheels from the ground and rigidly secure the trailer to the truck bed.

15 Claims, 5 Drawing Figures

PATENTED JUL 23 1974 3,825,089
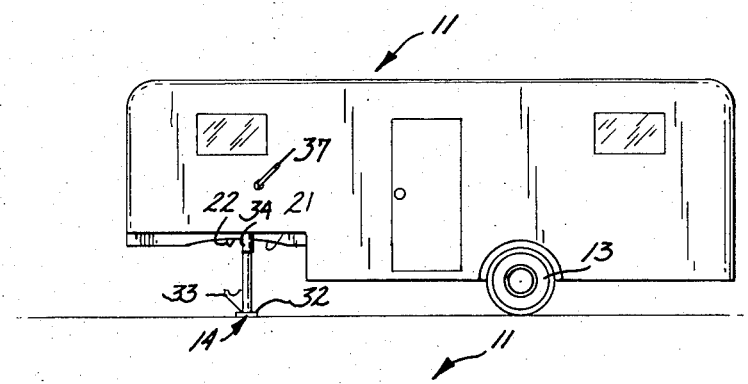
FIG. 1
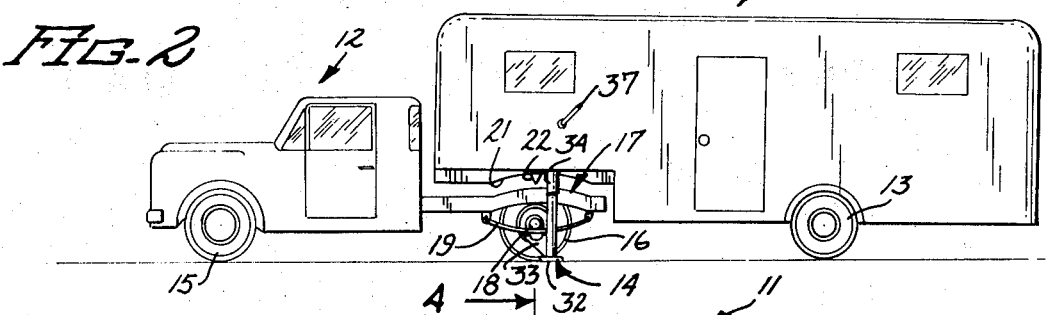
FIG. 2
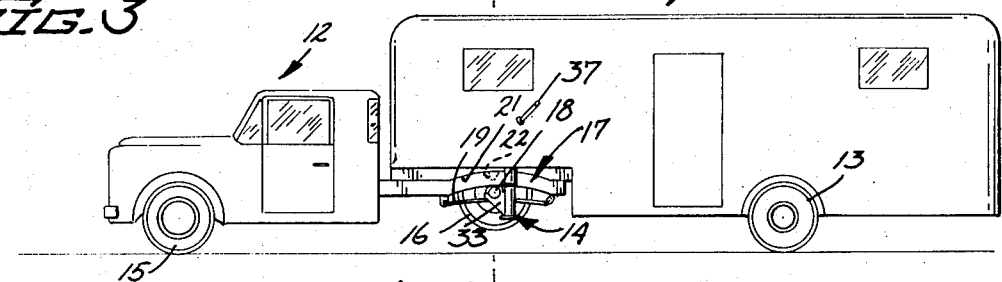
FIG. 3
FIG. 4
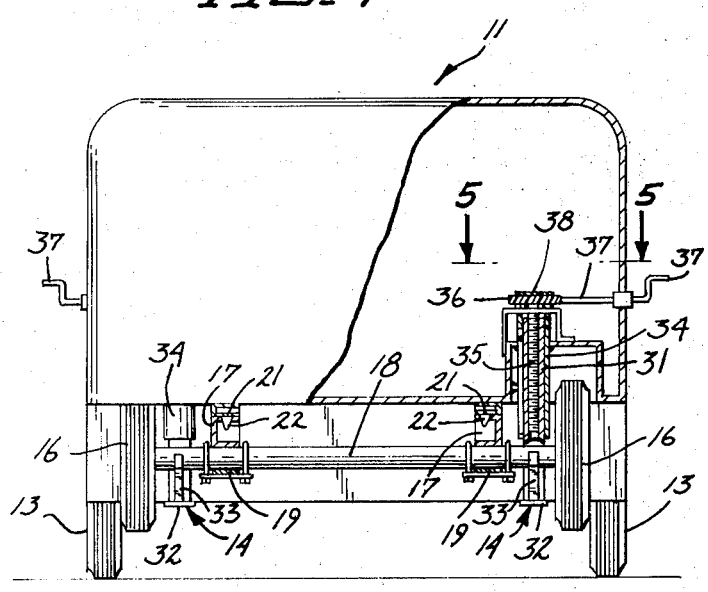
FIG. 5
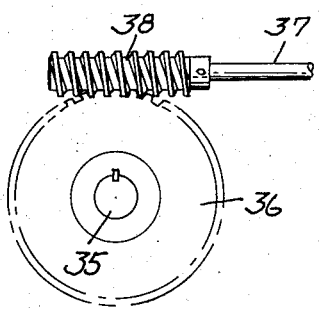
INVENTOR.
DAVID M. MURPHY
BY
Merchant & Gould
ATTORNEYS

HOUSE TRAILER HOOK-UP

This is a continuation of application Ser. No. 115,587, filed Feb. 16, 1971 now abandoned.

The invention relates to trailers and hauling vehicles therefor.

It is well known that large trailers, particularly house trailers, are extremely difficult to transport by reason of their great weight and size. Maneuverability is a primary drawback due to the conventional manner of pivotally connecting the trailer to the hauling vehicle with a hitch. The difficulty encountered in turning movement is compounded since the hauling vehicle and trailer move as independent, connected units. Further, notwithstanding load distributing devices, the conventional connection of trailer and hauling vehicle results in an increased load on the rear of the vehicle which impairs its steerability.

My invention is the result of an endeavor to solve the problems attendant with conventional hitches, and comprises in part a hauling vehicle having retractable rear wheels. The trailer with which it is intended to be used includes at least one pair of wheels mounted rearwardly of the center of longitudinal weight distribution, and stand means for supporting the front end of the trailer when it is at rest.

The hauling vehicle has a trailer supporting portion consisting of a bed disposed over the retractable rear wheels, and the front portion of the trailer is constructed to be received by the vehicle bed. The stand means for the trailer are also retractable, and they are constructed to engage the rear wheels of the vehicle with upward movement, which in turn lifts the wheels from the ground. The stand is designed with a significant load bearing characteristic, resulting in a rigid, secure connection of the vehicle and trailer while permitting the combination to move as a unit.

I am aware of other devices which provide a similar connection between a trailer and the hauling vehicle therefor. However, the supporting mechanisms are largely complex and do not lend themselves to non-commercial trailer transporting. My invention is easily adapted for use by an individual trailer owner, and permits both connection and disconnection of the trailer and vehicle by a single person.

BRIEF DESCRIPTION OF THE DRAWINGS

FIG. 1 is a side elevation of a house trailer vehicle embodying the inventive principle;

FIG. 2 is a side elevation showing the trailer and a trailer hauling vehicle relatively positioned for connection together, portions thereof removed;

FIG. 3 is a side elevation showing the trailer and hauling vehicle rigidly secured, portions thereof removed;

FIG. 4 is a view taken along a line 4—4 of FIG. 3, portions thereof being shown in full;

FIG. 5 is a fragmentary view in top plan taken along a line 5-5 of FIG. 4, portions thereof not shown.

DESCRIPTION OF THE PREFERRED EMBODIMENT

Referring initially to FIGS. 1-3, there is disclosed a house trailer represented generally by the numeral 11, and a truck for hauling the trailer 11, which is represented generally by the numeral 12. Trailer 11 is supported by a pair of wheels 13 which are mounted rearwardly of the center of longitudinal weight distribution of the trailer. Accordingly, when trailer 11 is at rest, a pair of auxiliary stands or jacks 14 are required to support the front end thereof.

Truck 12 is for the most part conventional in nature, being powered by an engine (not shown), and including a pair of front wheels 15 and rear wheels 16. Disposed at the rear of truck 12 is a trailer receiving bed 17 having a slightly concave portion disposed adjacent rear wheels 16.

Truck 12 departs from conventional construction in the suspension mounting of wheels 16. These wheels are rotatably carried on a rear axle 18, which is also operatively connected to the truck frame by a set of leaf springs 19. By virtue of the space between axle 18 in its normal supporting position and the lower edge of truck bed 17, wheels 16 may be retracted against the bias of leaf springs 19 to a position whereby rear axle 18 engages bed 17.

The front end of trailer 11 is cut away as shown to form a load bearing surface 21 which is essentially the same length as bed 17, and includes a concave portion conforming to the convex portion of bed 17. A projection 22 affixed to the concave portion and extending downward therefrom is arranged to be received in an opening in the load bearing surface 21 (FIG. 4) for maintaining proper alignment of the trailer and truck when they are brought together.

Each of the stands 14 is retractable, and the mechanism for effecting retracting movement is shown in detail in FIGS. 4 and 5.

Each stand 14 consists of an internally threaded tubular member 31 which terminates in a supporting foot 32 at its lower end. An axle engaging lift member 33 is rigidly affixed to the side of tubular member 31 immediately above supporting foot 32. Tubular member 31 is axially but nonrotatably slidable within a sleeve member 34, which is affixed to the trailer frame. A threaded rod 35 having a gear member 36 affixed to its upper end threadably projects into tubular member 31. Gear member 36 and rod 35 are rotated by a handle member 37, which is rotatably mounted on the trailer frame and carries a worm gear 38 which meshes with gear member 36. Rotation of handle 37 causes rod 35 to rotate, effecting axially outward or downward movement of tubular member 31 within sleeve 34 to cause lift member 33 to either engage or move away from axle 18.

In bringing trailer 11 and truck 12 together as a unit, trailer 11 is first elevated slightly above its normal position to permit bed 17 of truck 12 to move under the load bearing surface 21 of trailer 11. See FIG. 2. Handles 37 are then rotated (simultaneously if two persons are involved in the task, or alternately if but a single person is available), which causes the tubular member to begin retracting into the trailer frame. Initially, the front end of trailer 11 lowers until load bearing surface 21 engages bed 17 with the convex and concave portions thereof in proper alignment. With further retraction of stand 14 the unsupported weight of trailer 11 is evenly distributed over bed 17, after which the supporting foot 32 of stand 14 leaves the ground. With further upward movement, lift member 33 engages the axle 18, and rear wheels 13 begin to retract against the bias of leaf springs 19. This biasing force is sufficient to maintain trailer 11 and truck 12 in an essentially level position although ground support at that point is lost. The coupling operation ends as axle 18 engages the lower surface of bed 17, thereby effecting a rigid and secure connection of trailer 11 and truck 12. Additional connectors (not shown) may be used between bed 17 and the trailer frame to insure proper load distribution and to prevent uncoupling in the event of mechanized failure between stand 14 and axle 18. The truck-trailer combination is at this point ready to proceed as a unit and without the undesirable articulated movement attendant with conventional trailer hauling.

What is claimed is:

1. The combination of
a powered trailer hauling vehicle having front wheel means, rear wheel means and a trailer receiving portion disposed over the rear wheel means, the rear wheel means being retractably mounted and normally occupying a ground engaging position;
a trailer having wheel means for supporting at least a part of the trailer, and further including a front portion constructed and arranged for supporting engagement with the trailer receiving portion of the vehicle;
retractably mounted stand means for supporting the forward end of the trailer in a rest position, the stand means including a lift member constructed and arranged for engagement with the rear wheel means of the vehicle;
and means for retracting the stand means to effect engagement of the rear wheel means by said lift member and to retract the rear wheel means from said normal ground engaging position to cause rigid securement of the trailer to the powered vehicle and to permit hauling the trailer using said front wheel means and said trailer wheel means.

2. The combination defined by claim 1, wherein the rear wheel means of the trailer hauling vehicle comprises
an axle operatively connected to the vehicle by spring means;
and a pair of wheels rotatably mounted on the axle;

and the lift member as constructed and arranged to engage the axle.

3. The combination defined by claim 2, wherein the spring means comprises leaf springs normally biasing the axle toward the ground.

4. The combination defined by claim 1, wherein the retractable stand means comprises a pair of retractable stands respectively disposed adjacent the sides of the trailers, each of the stands having a lift member rigidly secured thereto.

5. The combination defined by claim 1, wherein the trailer receiving portion of the trailer hauling vehicle and the front portion of the trailer are mateable.

6. The combination as defined by claim 5, wherein the mateable portions are convex and concave.

7. The combination as defined by claim 1, wherein the means for retracting the stand means is actuated by manually rotatable handle means.

8. The combination as defined by claim 2, wherein the trailer supporting wheel means is mounted rearwardly of the center of longitudinal weight distribution of the trailer.

9. THe combination as defined by claim 2, wherein the axle is engageable with the frame of the trailer hauling vehicle to limit upward retracting movement thereof.

10. The combination defined by claim 1, wherein steering of the trailer hauling vehicle and the power and tractive effort therefor are effected through said front wheel means.

11. The combination of
a powered trailer hauling vehicle having front wheel means, rear wheel means and a trailer receiving portion disposed over the rear wheel means, the rear wheel means being retractably mounted and normally occupying a ground engaging position;
a trailer having wheel means for supporting at least a part of the trailer, and further including a front portion constructed and arranged for supporting engagement with the trailer receiving portion of the vehicle;
stand means for supporting the forward end of the trailer in a rest position;
and lifting means carried by the trailer and engageable with the rear wheel means of the vehicle for retracting said rear wheel means from the normal ground engaging position to cause rigid securement of the front portion of said trailer to the trailer receiving portion of said powered vehicle and to permit hauling the trailer using said front wheel means and trailer wheel means.

12. The combination defined by claim 11, wherein:

the rear wheel means of the trailer hauling vehicle comprises
an axle operatively connected to the vehicle by spring means;
and a pair of wheels rotatably mounted on the axle;

and the lifting means is constructed and arranged to engage the axle.

13. The combination defined by claim 12, wherein the spring means comprises leaf springs normally biasing the axle toward the ground.

14. The combination as defined by claim 12, wherein the trailer supporting wheel means is mounted rearwardly of the center of longitudinal weight distribution of the trailer.

15. The combination as defined by claim 12, wherein the axle is engageable with the frame of the trailer hauling vehicle to limit upward retracting movement thereof.

* * * * *